United States Patent
Akavaram et al.

(10) Patent No.: US 12,153,527 B2
(45) Date of Patent: Nov. 26, 2024

(54) DATA RATE INCREASE FOR FAULTY LANE RECOVERY IN MULTIPLE LANE DATA LINKS

(71) Applicant: QUALCOMM Incorporated, San Diego, CA (US)

(72) Inventors: Santhosh Reddy Akavaram, Hyderabad (IN); Prakhar Srivastava, Lucknow (IN); Rajendra Varma Pusapati, Hyderabad (IN); Ravindranath Doddi, Hyderabad (IN); Yogananda Rao Chillariga, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 18/081,396

(22) Filed: Dec. 14, 2022

(65) Prior Publication Data

US 2024/0202140 A1    Jun. 20, 2024

(51) Int. Cl.
G06F 13/40    (2006.01)
G06F 13/12    (2006.01)

(52) U.S. Cl.
CPC .... G06F 13/126 (2013.01); *G06F 2213/0026* (2013.01)

(58) Field of Classification Search
None
See application file for complete search history.

(56) References Cited

U.S. PATENT DOCUMENTS

| 9,244,799 | B2* | 1/2016 | Dreps | G06F 11/3041 |
| 10,754,798 | B1* | 8/2020 | Burke | G06F 13/4282 |
| 10,846,247 | B2* | 11/2020 | Das Sharma | G06F 13/4063 |
| 11,960,367 | B2* | 4/2024 | Jeon | G06F 11/0745 |
| 2009/0094401 | A1* | 4/2009 | Larson | H04L 47/10 710/316 |
| 2018/0196710 | A1* | 7/2018 | Iyer | H04L 1/0041 |
| 2020/0259936 | A1* | 8/2020 | Lusted | H04L 49/351 |
| 2022/0374319 | A1* | 11/2022 | Jeon | G06F 13/4221 |
| 2022/0374384 | A1* | 11/2022 | Jeon | G06F 13/4221 |

OTHER PUBLICATIONS

International Search Report and Written Opinion—PCT/US2023/078384—ISA/EPO—Jan. 25, 2024.

* cited by examiner

*Primary Examiner* — Michael Sun
(74) *Attorney, Agent, or Firm* — Loza & Loza, LLP/Qualcomm

(57) ABSTRACT

Aspects relate to lane failure recovery for a data link having multiple lanes labeled in a contiguous sequence. In one aspect, a failure of a failed lane of the data link is detected. Working lanes of the data link are then detected. A set of contiguous working lanes of the data link are selected, and an operational link as including the selected set of contiguous working lanes is defined. A start address of the operational link is identified and stored in a configuration register. Data traffic is transmitted on the operational link.

24 Claims, 10 Drawing Sheets

DATA RATE INCREASE FOR FAULTY LANE RECOVERY IN MULTIPLE LANE DATA LINKS

TECHNICAL FIELD

Aspects of the present disclosure relate generally to multiple lane data links and, more particularly, to increasing the data rate for faulty lane recovery.

BACKGROUND

High-speed interfaces are frequently used between circuits and components of mobile wireless devices and other complex systems. For example, certain devices may include processing, communications, storage and/or display devices that interact with one another through one or more high-speed interfaces. Some of these devices, including synchronous dynamic random-access memory (SDRAM), may be capable of providing or consuming data and control information at processor clock rates. Other devices, e.g., display controllers, may use variable amounts of data at relatively low video refresh rates.

The peripheral component interconnect express (PCIe) interface is a popular high-speed interface which supports a high-speed link capable of transmitting data at multiple gigabits per second. The interface also supports multiple speeds and multiple numbers of lanes. PCIe provides lower latency and higher data transfer rates compared to parallel buses. PCIe is specified for communication between a wide range of different devices. Typically, one device, e.g., a processor or hub, acts as a host, that communicates with multiple devices, referred to as endpoints, through PCIe links. The peripheral devices or components may include graphics adapter cards, network interface cards (NICs), storage accelerator devices, mass storage devices, Input/Output interfaces, and other high-performance peripherals.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example a method includes detecting a failure of a failed lane of a data link, the data link having multiple lanes that are labeled in contiguous sequence, detecting working lanes of the data link, and selecting a set of contiguous working lanes of the data link. The method further includes defining an operational link as including the selected set of contiguous working lanes, and transmitting data traffic on the operational link In another example a non-transitory computer-readable medium has instructions stored therein for causing a processor of an interconnect link to perform the operations of the method above.

In another example an apparatus includes an interface circuit configured to provide an interface with a multiple lane data link. Configuration registers store parameters of the data link. A controller is configured to detect working lanes of the data link, select a set of contiguous working lanes of the data link, define an operational link as including the selected set of contiguous working lanes, and transmit data traffic on the operational link.

In another example, an apparatus includes means for detecting a failure of a failed lane of a data link, the data link having multiple lanes that are labeled in contiguous sequence, means for detecting working lanes of the data link, means for selecting a set of contiguous working lanes of the data link, means for defining an operational link as including the selected set of contiguous working lanes, and means for transmitting data traffic on the operational link To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
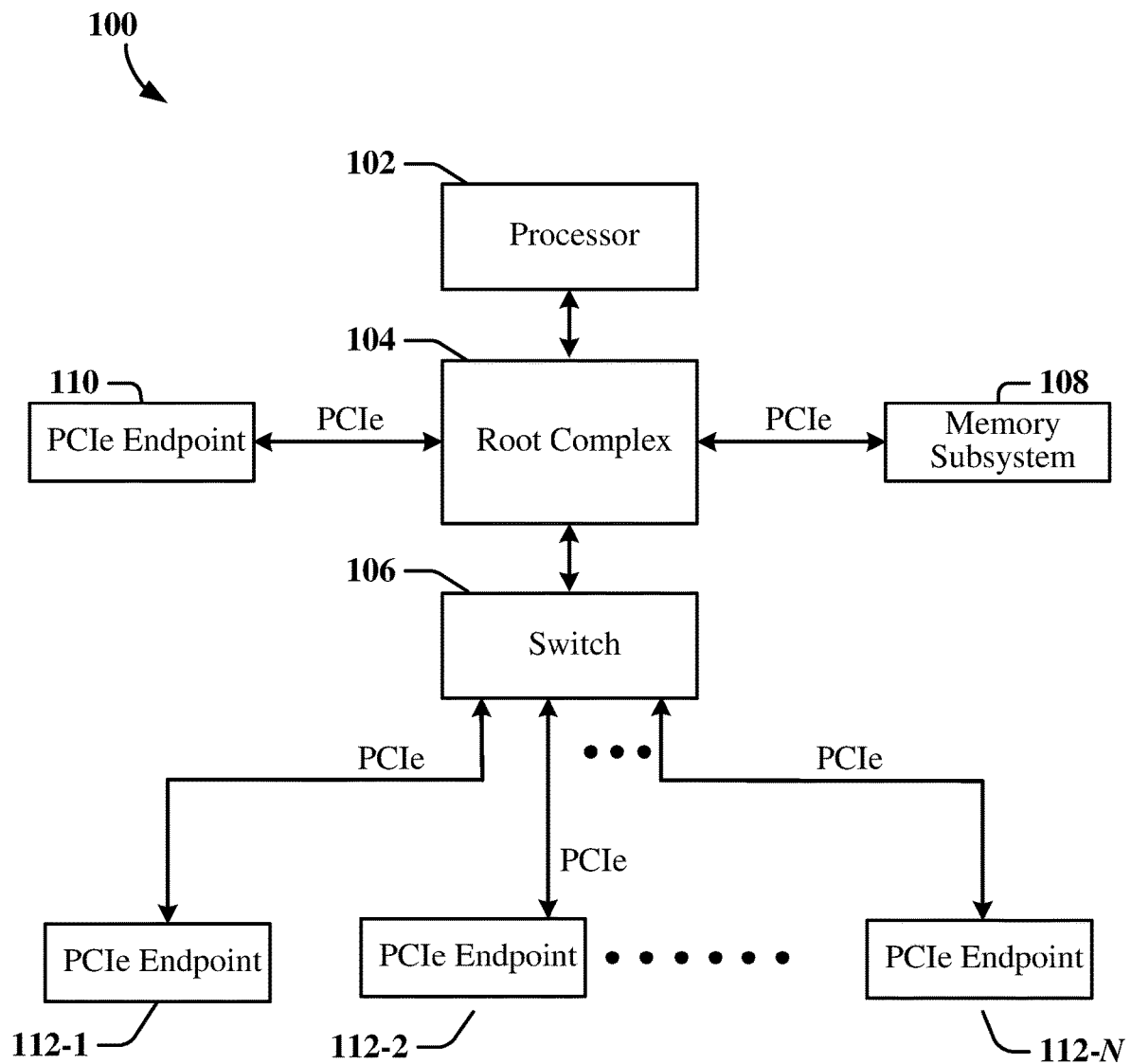
FIG. 1 is a block diagram of a computing architecture with PCIe interfaces suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

In a PCIe system, e.g., a root complex (RC) connected to an endpoint (EP) over a PCIe link, hostile environments and wear can cause lanes of a link to fail. In a controlled and accessible environment, a failed link can be assessed and quickly addressed, however, the use of multi-lanes links, such as PCIe has expanded well beyond such locations and for many different uses for example, vehicular applications and communications infrastructure including cellular radio towers. The reliability of a link may be affected by different types of hardware, firmware, or software failures and performance degradation over time. The variety of components and vendors in a completed system, the array of failures, and the challenges of scale, make monitoring, collecting data, and performing fault isolation for PCIe-based components challenging.

In many cases, a lane failure will cause a much greater restriction in the available link width configurations than may be physically necessary. In various aspects of the disclosure, a set of contiguous working lanes may be identified. In addition, a start address may be identified for the set of contiguous working lanes and stored in a configuration register. This allows a link to be established starting with any of the available working lanes. As an example, if lane 1 of an x8 data link fails, then by using lane 0 as the start address, as is normally assumed, only lane 0 may be used. This gives a maximum link width of x1. However, if a new start address of lane 2 may be identified and stored in a configuration register, then lanes 2 through 7 become available and link widths of x1, x2, and x4 may be used.

In addition, as described herein, a link width may be selected and stored in the configuration register. In the example of lane 1 failing in an x8 data link, no more than 4 lanes may be used, even though 7 lanes are operational, including 6 contiguous lanes. This applies also using lane reversal in which the same 6 contiguous lanes 7 through 2 are available, but the maximum link width is x4 using lanes 7, 6, 5, and 4. By selecting all 6 contiguous lanes, lanes 2 through 7, more data may be carried over the link. In order to allow the RC and EP to communicate using 5 or 6 lanes instead of 4 lanes, an additional parameter is identified and stored in the configuration register in addition to the start address. The additional parameter may be the link width, where additional link widths are allowed, for example x5 and x6. Alternatively, or in addition, an end address may be identified and stored.

In the above example of an x5 link starting with lane 2, the start address at lane 2 may be stored with the link width of x5. The end address will be lane 6. With lane reversal, the start address may be lane 7, with an end address of lane 3 and a link width of x5. By specifically identifying the start and end address, different sets of lanes may be used than is conventionally permissible. Instead of using lane 2 as the start address, the RC or EP may identify lane 3 as the start address for an x5 link that ends with lane 7. With larger data links, for example, x16 and x32, there may be several different possible start addresses available after a lane failure.

PCIe is a point-to-point interconnect that supports both internal and external connectivity either across a cable assembly or at the printed circuit board (PCB) level. Connections may be made chip-to-chip with no connectors, through an expansion card interface with a board and a connector, or on a backplane with multiple boards and connectors. In a complex backplane, there are many reasons that the signal integrity may degrade, including cross-talk, reflection, discontinuities, and channel loss. Higher data rates are also more sensitive to loss.

A connection between any two PCIe devices, e.g., an RC and an EP, is referred to as a link. A PCIe link is built around a duplex, serial (1-bit), differential, point-to-point connection referred to as a lane. With PCIe, data is transferred over two signal pairs: two lines (wires, circuit board traces, etc.) for transmitting and two lines for receiving. The transmitting and receiving pairs are separate differential pairs for a total of four data lines per lane. The link encompasses a set of lanes, and each lane is capable of sending and receiving data packets simultaneously between the host and the endpoint.

In PCIe, multiple contiguous lanes are combined to create a link. A first lane, referred to herein as lane 0, is used in an x1 link. First and second lanes, referred to herein as lane 0 and lane 1, are used in an x2 link. Each link width starts at lane 0 and adds additional contiguous lanes, in sequential order to achieve the desired link width. A PCIe link may be configured to use less than all of its lanes in order to save power or for compatibility. As currently defined, the link width may be up-sized to a larger width or down-sized to a smaller width during operation. Presently link widths of x1, x2, x4, x8, x16, and x32 are allowable for a PCIe data link. Using this system, if lane 3 of an 8 lane data link fails, then only lanes 0-1 may be used. The data link may be configured as x1, or x2, but not x4, or x8. Lanes 4-7 may no longer be used due to the failure of lane 3. In an expansion of PCIe, lane reversal allows the last lane of the sequence to be used as the first lane. With lane reversal, when lane 3 fails, then lanes 7-4 may be used. This allows for an x1 link using lane 7, an x2 link using lanes 7 and 6, or an x4 link using lanes 7, 6, 5, and 4. If lanes 0 and 7 both fail, then no link may be formed with or without lane reversal.

PCIe allows the link width to be changed as data traffic demands change. With a record of which lane has failed, the RC or EP can select different sets of contiguous working lanes to meet different link widths. PCIe also allows for different data rates, referred to as a GEN speed. The link speed is referred to as the GEN speed because newer generations of PCIe standards provide for new higher speeds. For example, PCIe GEN1 allows for 2.5 giga transfers per second (GT/s), PCIe GEN2 allows for 5 GT/s, PCIe GEN3 allows for 8 GT/s, PCIe GEN4 allows for 16 GT/s, PCIe GEN5 allows for 32 GT/s, and later generations may offer still higher data rates for each lane of a link. Higher speeds provide data transfer benefits but also consume more power and are more prone to errors. As a result, a PCIe link may be managed to operate at a lower GEN speed until there are high data rate demands on the link.

When a GEN speed switch is requested by either the RC or EP, the PCIe link is disabled from operation at the first speed and then performs training, recovery, and configuration at the new requested GEN speed. After this, the PCIe link is active again and ready to carry data at the new requested GEN speed. The link width may also be changed at the same time. The process is the same for an increase or decrease in speed and link width. The RC and EP negotiate an appropriate combination of speed and width to carry the expected data traffic.

FIG. 1 is a block diagram of an example computing architecture using PCIe interfaces. The computing architecture 100 operates using multiple high-speed PCIe interface serial links. A PCIe interface may be characterized as an apparatus including a point-to-point topology, where separate serial links connect each device to a host, which is referred to as a root complex 104 (RC). In the computing architecture 100, the root complex 104 couples a processor 102 to memory devices, e.g., the memory subsystem 108, and a PCIe switch circuit 106. In some instances, the PCIe switch circuit 106 includes cascaded switch devices. One or more PCIe endpoint devices 110 (EP) may be coupled directly to the root complex 104, while other PCIe endpoint devices 112-1, 112-2 . . . 112-N may be coupled to the root complex 104 through the PCIe switch circuit 106. The root complex 104 may be coupled to the processor 102 using a proprietary local bus interface or a standards-defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 supports multiple PCIe ports.

The root complex 104 may control communication between the processor 102 and the memory subsystem 108 which is one example of an endpoint. The root complex 104 also controls communication between the processor 102 and other PCIe endpoint devices 110, 112-1, 112-2 . . . 112-N. The PCIe interface may support full-duplex communication between any two endpoints, with no inherent limitation on concurrent access across multiple endpoints. Data packets may carry information through any PCIe link. In a multi-lane PCIe link, packet data may be striped across multiple lanes. The number of lanes in the multi-lane link may be negotiated during device initialization and may be different for different endpoints.

When one or more lanes of the PCIe links are being underutilized by low bandwidth applications that could be adequately served by fewer lanes, then the root complex 104 and endpoint may operate the link with more or fewer lanes. In some examples, one or more lanes may be placed in one or more standby states in which some or all of the lanes are operated in a low power or a no power mode. Varying the number of active lanes for low bandwidth applications reduces the power to operate the link. Supplying less power reduces current leakage, heat, and power consumption.

Figure 2:
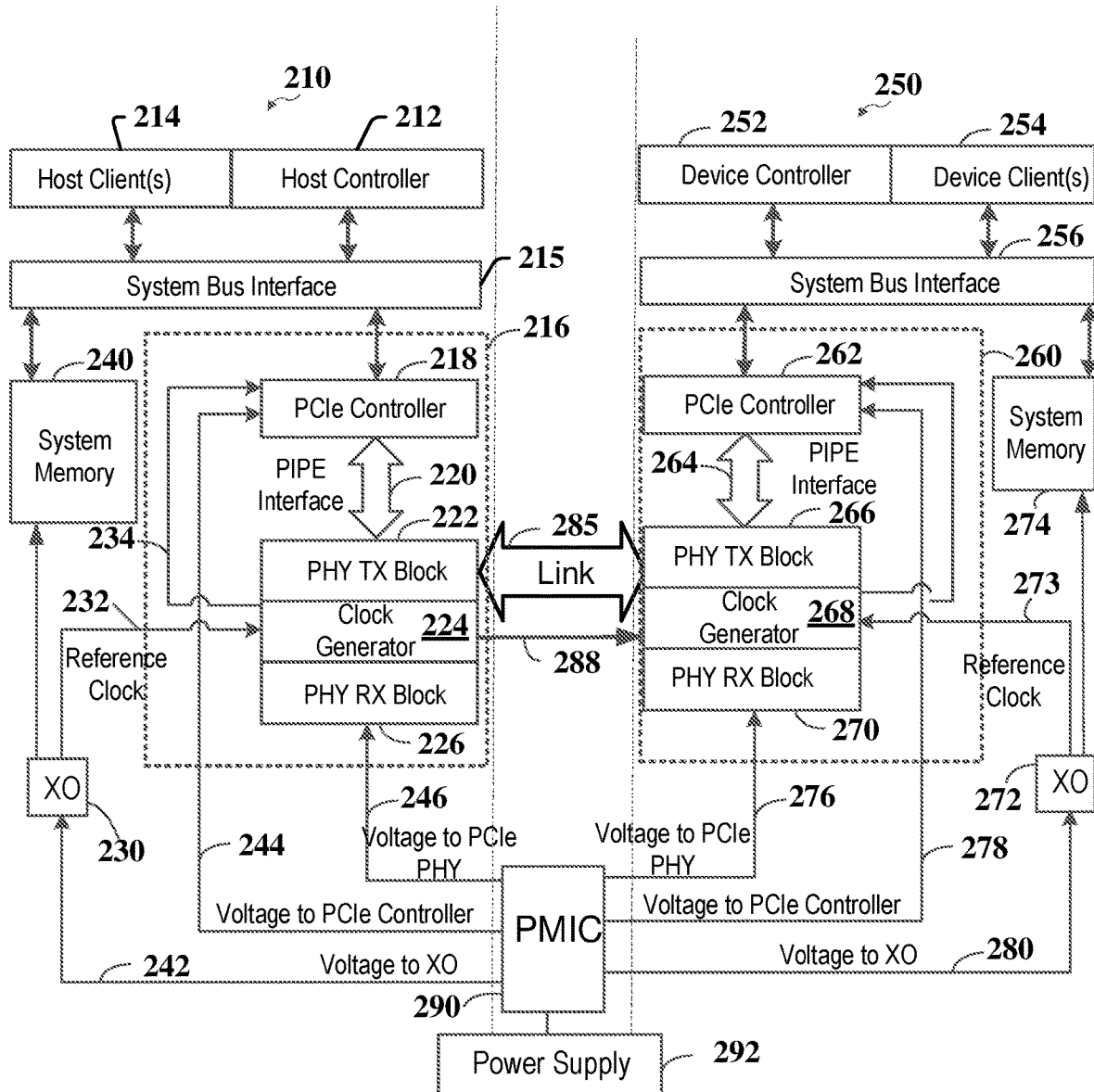
FIG. 2 is a block diagram of a system including a host system and an endpoint device system according to aspects of the present disclosure.

FIG. 2 is a block diagram of an exemplary PCIe system in which aspects of the present disclosure may be implemented. The system 205 includes a host system 210 and an endpoint device system 250. The host system 210 may be integrated on a first chip (e.g., system on a chip or SoC), and the endpoint device system 250 may be integrated on a second chip. Alternatively, the host system, for example an RC, and/or endpoint device (EP) system may be integrated in first and second packages, e.g., SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as discussed further below.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of active lanes or to change the GEN speed based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer and control flow functions.

The host system memory 240 and the endpoint system memory 274 at the endpoint may be configured to contain registers for the configuration and status of each lane of the PCIe link 285 and for the link itself. These registers include group control registers and group status registers. In examples, the host system memory 240 and the endpoint system memory 274 both have a link GEN control register, a status register, and a capabilities register, among others.

The endpoint device system 250 also includes an oscillator (e.g., crystal oscillator) 272 configured to generate a stable reference clock signal 273 for the endpoint system memory 274. In the example in FIG. 2, the clock generator 224 at the host system 210 is configured to generate a stable reference clock signal 273, which is forwarded to the endpoint device system 250 via a differential clock line 288 by the PHY RX block 226. At the endpoint device system 250, the PHY RX block 270 receives the EP reference clock signal on the differential clock line 288, and forwards the EP reference clock signal to the clock generator 268. The EP reference clock signal may have a frequency of 100 MHz, but is not limited to such frequency. The clock generator 268 is configured to generate multiple clock signals based on the EP reference clock signal from the differential clock line 288, as discussed further below. In this regard, the clock generator 268 may include multiple PLLs, in which each PLL generates a respective one of the multiple clock signals by multiplying up the frequency of the EP reference clock signal.

The system 205 also includes a power management integrated circuit (PMIC) 290 coupled to a power supply 292 e.g., mains voltage, a battery or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244 and 246 may be programmable, in which the PMIC 290 is configured to set the voltage levels (corners) of the voltages 242, 244 and 246 according to instructions (e.g., from the host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278 and 276 may be programmable, in which the PMIC 290 is configured to set the voltage levels (corners) of the voltages 280, 278 and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244 and 246 and a second PMIC for generating voltages 280, 278 and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. In examples, the host controller negotiates a first bandwidth for the transmit group of the link and negotiates a second bandwidth for the receive group of the link. At the PCIe interface circuit 216, the PCIe controller 218 may perform transaction layer and data link layer functions on the data e.g., packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g., packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generates a clock based on the EP reference clock through a differential clock line 288, and inputs the clock to the PCIe controller 262 to time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

Figure 3:
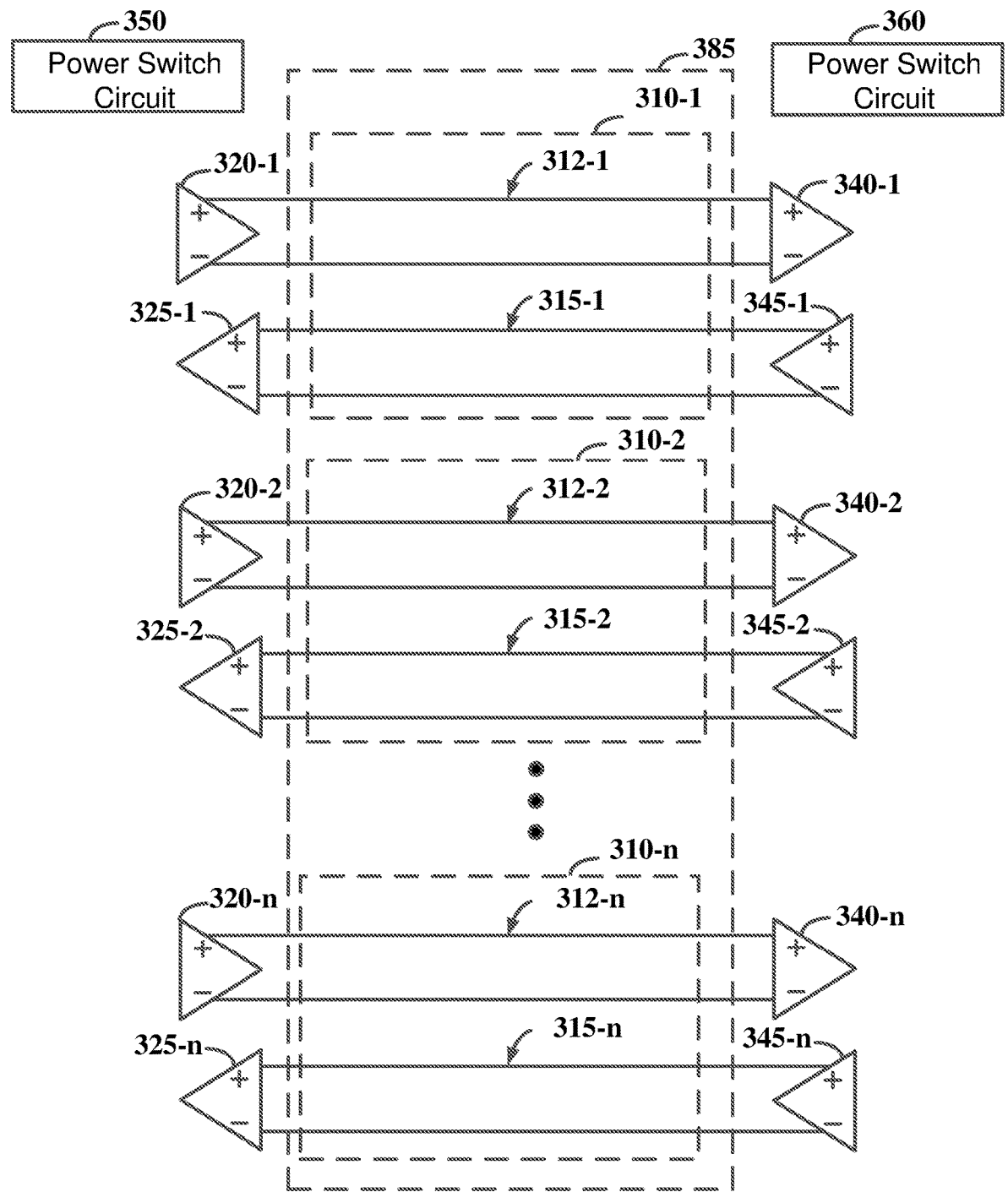
FIG. 3 is a diagram of lanes and corresponding drivers in a link according to aspects of the present disclosure.

FIG. 3 is a diagram of lanes in a link 385, e.g., the PCIe link 285, that may be used in the system of FIG. 1 and FIG. 2. In this example, the link 385 includes multiple lanes 310-1 to 310-n, in which each lane includes a respective first differential line pair 312-1 to 312-n for sending data from the host system 210 to the endpoint device system 250, and a respective second differential line pair 315-1 to 315-n for sending data from the endpoint device system to the host system 210. From the perspective of the host system, the first lane 310-1 is dual simplex, with a first differential line pair 312-1 as transmit lines and a second differential line pair 315-1 as receive lines. From the perspective of the endpoint device system, the first lane 310-1 has receive lines and transmit lines. The first differential line pairs 312-1 to 312-n and the second differential line pairs 315-1 to 315-n may be implemented with metal traces on a substrate (e.g., printed circuit board), in which the host system may be integrated on a first chip mounted on the substrate and the endpoint device is integrated on a second chip mounted on the substrate. Alternatively, the link may be implemented through an adapter card slot, a cable, or a combination of different media. The link may also include an optical portion in which the PCIe packets are encapsulated within a different system. In this example, when data is sent from the host system to the endpoint device system across multiple lanes, the PHY TX block 222 may include logic for partitioning the data among the lanes. Similarly, when data is sent from the endpoint device system to the host system 210 across multiple lanes, the PHY TX block 266 may include logic for partitioning the data among the lanes.

The PHY TX block 222 of the host system 210 shown in FIG. 2 may be implemented to include a transmit driver 320-1 to 320-n to drive each first differential line pair 312-1 to 312-n to transmit data and the PHY RX block 270 of the host shown in FIG. 2 may be implemented to include a receiver 340-1 to 340-n (e.g., amplifier) to drive each second differential line pair 312-1 to 312-n to receive data. Each transmit driver 320-1 to 320-n is configured to drive the respective differential line pair 312-1 to 312-n with data and each receiver 340-1 to 340-n is configured to receive data from the respective first differential line pair 312-1 to 312-n. Also, in FIG. 2, the PHY TX block 266 of the endpoint device system 250 may include a transmit driver 345-1 to 345-n for each second differential line pair 315-1 to 315-n and the PHY RX block 226 of the host system 210 may include a receiver 325-1 to 325-n (e.g., amplifier) for each second differential line pair 315-1 to 315-n. Each transmit driver 345-1 to 345-n is configured to drive the respective second differential line pair 315-1 to 315-n with data and each receiver 325-1 to 325-n is configured to receive data from the respective second differential line pair 315-1 to 315-n.

In certain aspects, the width of the link 385 is scalable to match the capabilities of the host system and the endpoint. The link may use one lane, the first lane 310-1, for an x1 link, two lanes, 310-1, 310-2 for an x2 link or more lanes for wider links up to n lanes from 310-1 to 310-n. Currently links are defined for 1, 2, 4, 8, 16, and 32 lanes, although a different number of lanes may be used to suit particular implementations.

In one example, the host system 210 may include a power switch circuit 350 configured to individually control power to the transmit drivers 320-1 to 320-n and the receivers 325-1 to 325-n from the PMIC 290. Therefore, in this example, the number of drivers and receivers that are powered on scales with the width of the link 385. Similarly, the endpoint device system 250 as was shown in FIG. 2 may include a power switch circuit 360 configured to individually control power to the transmit drivers 345-1 to 345-n and the receivers 340-1 to 340-n from the PMIC 290. In this way the host system sets a number of the plurality of drivers to be selectively powered by the power switch circuit to change a number of active transmit lines or receive lines based on the number of lines that are powered. With differential signaling the lines will be set as active or standby in pairs.

Figure 4:
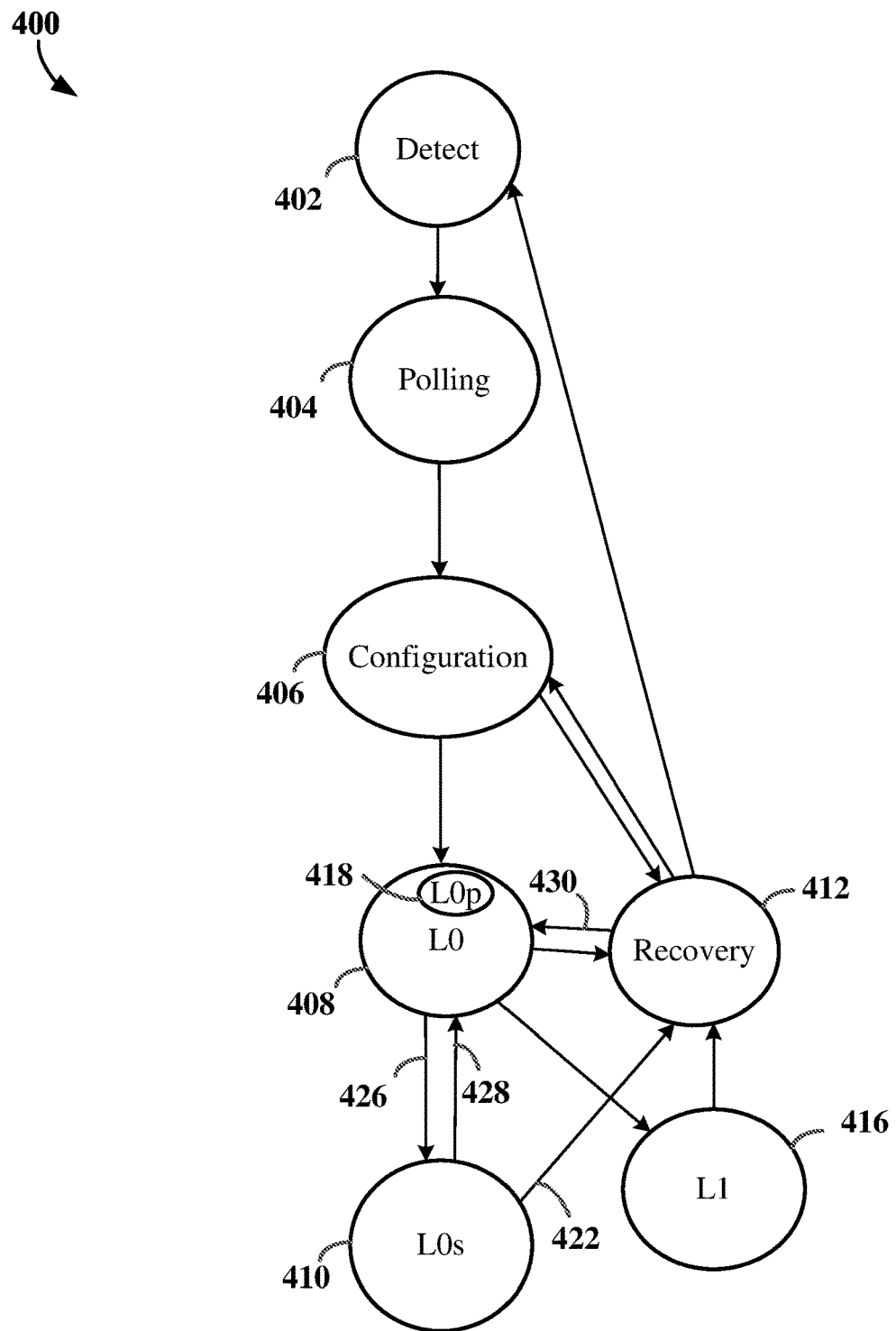
FIG. 4 is a state diagram illustrating the operation of a power management state machine according to aspects of the present disclosure.

FIG. 4 is a state diagram 400 illustrating the operation of a portion of a power management state machine in accordance with certain aspects disclosed herein. The Active State Power Management (ASPM) protocol is a state machine approach to reduce power based on link activity detected over the PCIe link between the root complex (RC) and an endpoint (EP) PCIe device. The state diagram is consistent with the Link Training and Status state machine (LTSSM) as defined for PCIe. However, other approaches may be used instead.

Power management and bandwidth negotiation may be performed at link initialization but may also be repeated at later times. During negotiation, each link partner, e.g., an RC and an EP, may advertise a supported number of lanes (e.g., link width) and a desired bandwidth at which to operate. For example, the link partners may agree to operate at the highest bandwidth supported by both partners. The link partners are negotiating that some number of lanes of the link be in an active state and may change the number of lanes to a lower rate for link stability reasons. In an example, the link width may be changed autonomously by hardware. As the number of lanes increases, the power to operate the link also increases. As such, an x16 link may be operated as an x1 link at lower power in some circumstances. This reduces the power consumed by the supporting hardware during low-activity periods.

In the illustrated ASPM approach, the link operates in an L0 state 408 (i.e., link operation state) when data is being transferred over the PCIe link. There may be other operational states, e.g., an L0p sub-state 418, and L0s state 410, etc. The L0p sub-state 418 is not an inactive or idle state. When the L0p sub-state 418 is enabled, then the link can be configured in an L0p active state in which, based on data rate requirements, the link can be downsized by putting a few of the lanes in electrical idle while still carrying data on other lanes that are in an active L0p sub-state. Similarly, for upsizing requests, electrical idle lanes can be independently retrained to the L0p active sub-state without disturbing ongoing data transfers on other active lanes in the link. The ASPM protocol may also support additional active and standby states and substates, e.g., L1, L2, L1.1 and L1.2 etc. As shown, the L0s state 410 is only accessible through a connection through the L0 state 408. An ASPM state change may be initiated when conditions on a link dictate or suggest that a transition between states is desired or appropriate. Both communication partners on the link may initiate power state change requests when conditions are right.

The PCIe link initiates operation in a Detect state 402. In this state, the host controller of the RC and EP detect the active connection. The link then moves to a Polling state 404 during which the host controller of the RC polls for any active EP connections. Similarly, the EP host controllers poll the RC host controller. This allows the available link width and GEN speeds to be determined. Any failed lanes will be detected during polling as unresponsive or unreliable. The PCIe link then moves to a Configuration state 406 during which the RC and EP ports are configured for a particular link width and GEN speed. Some or all of the lanes are configured as active and any unused lanes are configured as idle, e.g., in an L0s state 410. The active lanes are in the L0 state 408. Failed lanes may be powered off.

When the link is idle (e.g., for a short time interval between data bursts), the link may be taken from the L0 state 408 to a standby state, e.g., the L0s state 410 which is accessible only through a connection to the L0 state 408. In this example, the L0s state 410 is a low power standby for the L0 state 408. An L1 state 416 is a standby state with a lower latency than the L0s state 410. The L0s state 410 serves as a standby state and also serves as an initialization state after a power-on, system reset, or after an error condition is detected. In the L0s state 410, device discovery and bus configuration processes may be implemented before the link transitions 428 to the L0 state 408. In the L0 state 408, PCIe devices may be active and responsive to PCIe transactions, and/or may request or initiate a PCIe transaction. The L1 state 416 is a primary standby state and allows for a quick return to the L0 state 408 through a Recovery state 412. The L0s state 410 is a lower power state that allows for an electrical idle state and a transition may be made through the Recovery state 412. The L0s state 410 may be entered through a transition 426 when a PCIe device determines that there are no outstanding PCIe requests or pending transactions. Power consumption may be reduced by disabling or idling the transceivers in the PCIe bus interfaces, disabling clocks used by the PCI device, and/or disabling PLL circuits used to generate clocks used to receive data. A PCIe device may make the transition 426 to the L0s state 410 through the operation of a hardware controller or some combination of operating system and hardware control circuits.

When the PCIe link becomes active while a device, e.g., an RC or EP, is in an electrical idle state, e.g., the L0s state 410, a return to the L0 state 408 is initiated for the device. A direct transition to the L0 state 408 may not be available. The PCIe link may first transition 422 to a Recovery state 412 in which the transceivers in the PCIe bus interfaces, clocks used by the PCI device, and/or PLL circuits are enabled. When the transceivers and other circuits are determined to be functional, then a transition 430 from the Recovery state 412 to the L0 state 408 may be initiated.

The ASPM protocol also manages GEN speed changes for a PCIe link. A PCIe link may be operated at a lower GEN speed to save power or a higher GEN speed to provide higher performance. To change the GEN speed, the ASPM protocol takes the active lane out of the L0 state 408 back to the Configuration state 406 to configure the link to the new GEN speed. After configuration, the PCIe link is taken back to the L0 state to operate in the newly configured GEN speed. In some aspects, when there are some lanes in the L0 state 408 and other lanes in the L0s state 410, the lanes in the L0 state 408 can continue to operate in the L0 state 408 while the other lanes are transitioned to the Configuration state 406. The lanes in the Configuration state 406 are configured to the new GEN speed and then transitioned to the L0 state 408 to operate in the new GEN speed. The lanes that were in the L0 state can be transitioned to an idle state e.g., the L0s state 410. These lanes can be reconfigured in the Configuration state 406 or may remain in the L0s state 410 for later use.

The ASPM protocol may also manage the link width to reduce or increase the link width, also referred to as up-sizing or down-sizing the link width. By reducing the link width during low throughput data traffic scenarios, subsystems of the PCIe link scale down voltage levels (e.g., to lower operating levels that satisfy current throughput over the PCIe link). The scaled down one or more voltage levels reduce power consumption (e.g., reduce leakage currents during sustained low throughput traffic or in idle use case). The number of lanes also affects power consumption. In effect, there is an L0, L0s, L1 transition state diagram for each lane.

When a faulty lane has been detected, through polling or in operation, and the faulty lane is active, then a new link width is configured that excludes the faulty lane. There may be retry attempts to make the faulty lane active. However, if the lane cannot be used, then the link width must be changed to exclude the faulty lane. When a faulty lane is detected with L0p enabled and the number of lanes in electrical idle are equal or more in number to the currently active lanes, then it may be possible to reconfigure the link to preserve the original link width. When an active lane goes faulty, then PCIe data transfers are suspended and the link repeats the training by reentering the detect state 402. The link training with a faulty lane may take significant time, for example about 2 ms and the subsequently configured link may have a lower link width compared to the link before the lane failure. By changing the start address for the subsequently configured link, the highest available link width may be maintained.

Figure 5A:
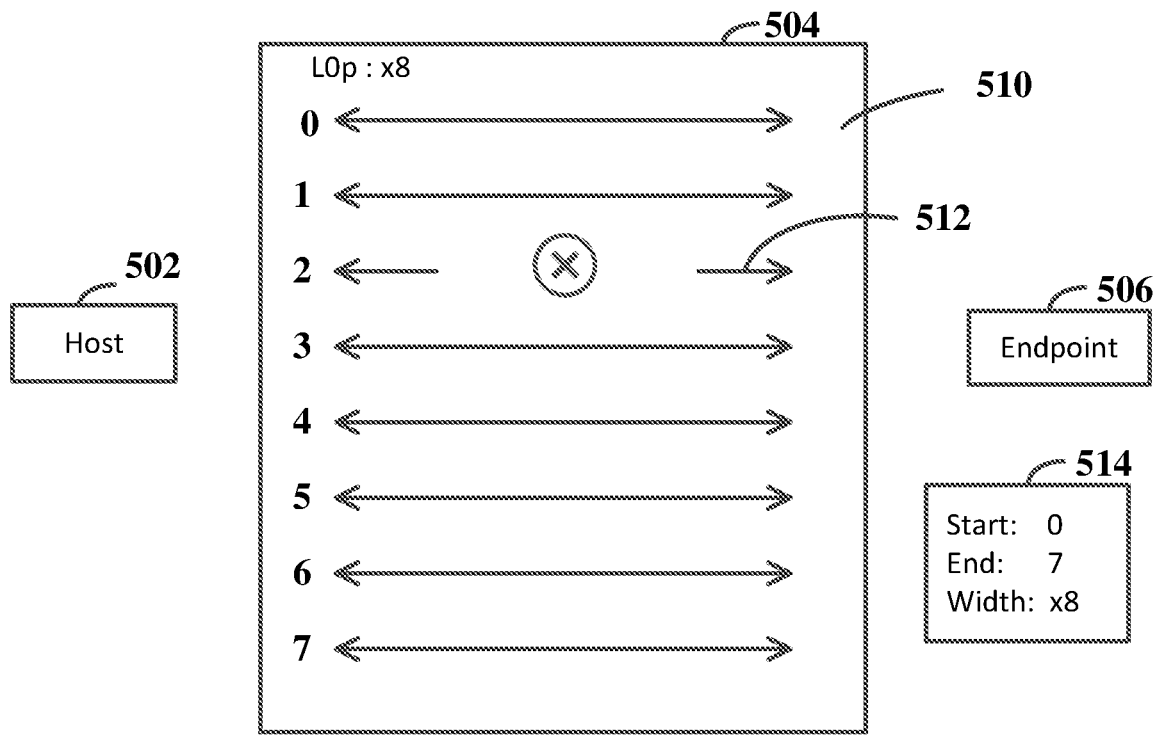
FIG. 5A is a diagram of a multiple lane data link with eight lanes and lane 2 failed according to aspects of the present disclosure.

FIG. 5A is a diagram of a multiple lane data link 504 e.g., a PCIe link of duplex traffic lanes between a host 502 and an EP 506. The lanes each include a line in each direction so that the data rate and configuration is the same in both directions. The duplex traffic lanes may have the same physical structure as in FIG. 3 but are generalized to show a transition from one link width and lane configuration to another link width and lane configuration. The data link 504 includes eight lanes. The duplex traffic lanes are in the same structure and capability as in the example shown in FIG. 3. Each lane includes two transmit lines as a differential line pair and two receive lines as a differential line pair for four lines per lane and thirty-two lines for the x8 link. All of the lanes 510, lanes 0 to 7, as identified on the right, are in an active state, e.g., an L0 state, as an x8 link. Data may be transmitted in one or both directions with a particular data rate or speed configuration, e.g., GEN2 speed. The configuration of the link may be stored in a configuration, control, or capabilities register 514 and includes a start address of 0, an end address of 7, and a width of x8. In some examples, the register 514 may be maintained in the system memory 240, 274 of a PCIe controller or in another location. The address table with start and end addresses, or start address and link width may be maintained at both the RC and the host.

One of the lanes, for example, lane 2 is a failed lane 512 and is unable to transmit any traffic. As a result, the entire link is down, regardless of the state of any of the lanes. The address, 2, of the faulty lane will also be stored in the capabilities register 514. Using the first lane as the start address, the corrupted lane, lane 2, causes the loss of 6 lanes even though 5 of the lanes are still working. This results a in loss of bandwidth through the data link. For an x16 or x32 link, the loss would be even more significant both as an absolute number and as a proportion of the total. With lane reversal, an x4 link could be established starting with lane 7 and including lanes 6, 5, and 4. While eight lanes are shown, there may be more or fewer lanes to suit particular implementations. As mentioned above, PCIe data links operate on a rule of 2 so that x1, x2, x4, x8, x16 and x32 are supported. The data link 504 is configured as an x8 data link, but the link width may be configured as x1, x2, or x4 at any GEN speed to operate more efficiently for the data rate carried by the link.

Figure 5B:
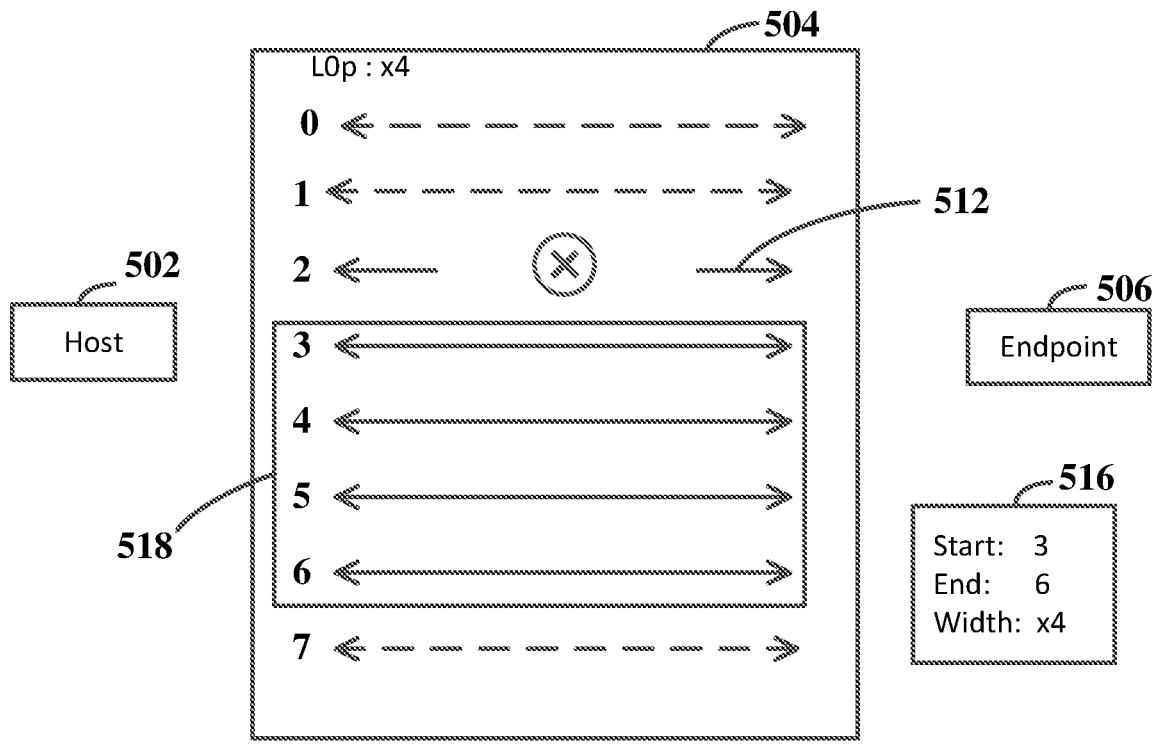
FIG. 5B is a diagram of the multiple lane data link with eight lanes operating with lanes 3-7 according to aspects of the present disclosure.

FIG. 5B shows the multiple lane data link 504 between the host 502 and the EP 506 after being reconfigured with a new start address and a new link width according to aspects of the disclosure. There may also be training to a new data rate. In one aspect, when a controller at the host 502 or EP 504 determines that lane 2 has failed, it will determine how to change the link and then send a request to change the start address and the link width of the link 504. The data rate of the data link 504 may also be changed in light of the link width change or to accommodate changed traffic demands. The request may be generated by the host controller or the EP controller and is then sent to the corresponding controller at the opposite end, e.g., the EP controller or the host controller, respectively.

In the example of FIG. 5B, after the faulty lane is detected, the set of contiguous lanes with maximum link width is chosen. Polling and configuration states are started with a start address or start lane pointer for the selected set of lanes. The other working lanes of the link can be detected as lanes 0, 1, 3, 4, 5, 6, and 7. The contiguous lanes are a first set of 0 and 1 and a second set of 3 through 7. The second set is larger and so it is selected for use as an operational link 518. This allows for the largest possible link using the remaining lanes. The lanes that are not part of the operational link are therefore transitioned to an idle state, for example, an electrical idle state. The configuration is stored in registers 516 as the start address of 3, the end address of 6, and the link width of x4. It is also possible to identify the start address as 4 and still maintain an x4 link width. Note that with conventional configurations in which lane 0 is the start address, only an x1 or x2 link width is possible.

The particular location of the configuration register may be adapted to suit different circumstances. In one aspect, a PCIe specification defines Device Control 3 registers in which 32 bits are assigned. The fourth bit, bit 3, is used to indicate whether the L0p state is enabled. The next three bits, 4 to 6, ([6:4]) are used to store the target link width. That allows for 8 possible link widths of which 6 are already defined. The remaining bits [31:7] are reserved. These may be used for start address and end address. In addition, one or two more bits may be used with the link width bits [6:4] to allow for additional link widths between the link widths that are allowable for a PCIe data link.

Once the new operational link with the contiguous working lanes of 3, 4, 5, and 6 is also brought up to the requested data rate, the GEN speed, the data traffic of the PCIe link may be carried on these lanes. This may be done by sending an interrupt, e.g., from the RC controller, to the host 502 and to the EP 506 to stop attempting to use the lanes of the original x8 link 510 and start using the new operational link 518. All of the unused lanes may be put directly into electrical idle before or after the new operational link is active. Alternatively, one or more of the working lanes may be retrained to the new data rate and then put into electrical idle. If there are other lanes in electrical idle that are not being used in this process, then those lanes may also be trained to the new data rate and then put into electrical idle. The retraining makes the idle lanes available for a link width up-sizing request at the new data rate. In this case, the only link width up-sizing would be to add lane 7 for an x5 link which may be supported if odd size link widths are enabled between the RC and the EP.

Figure 6A:
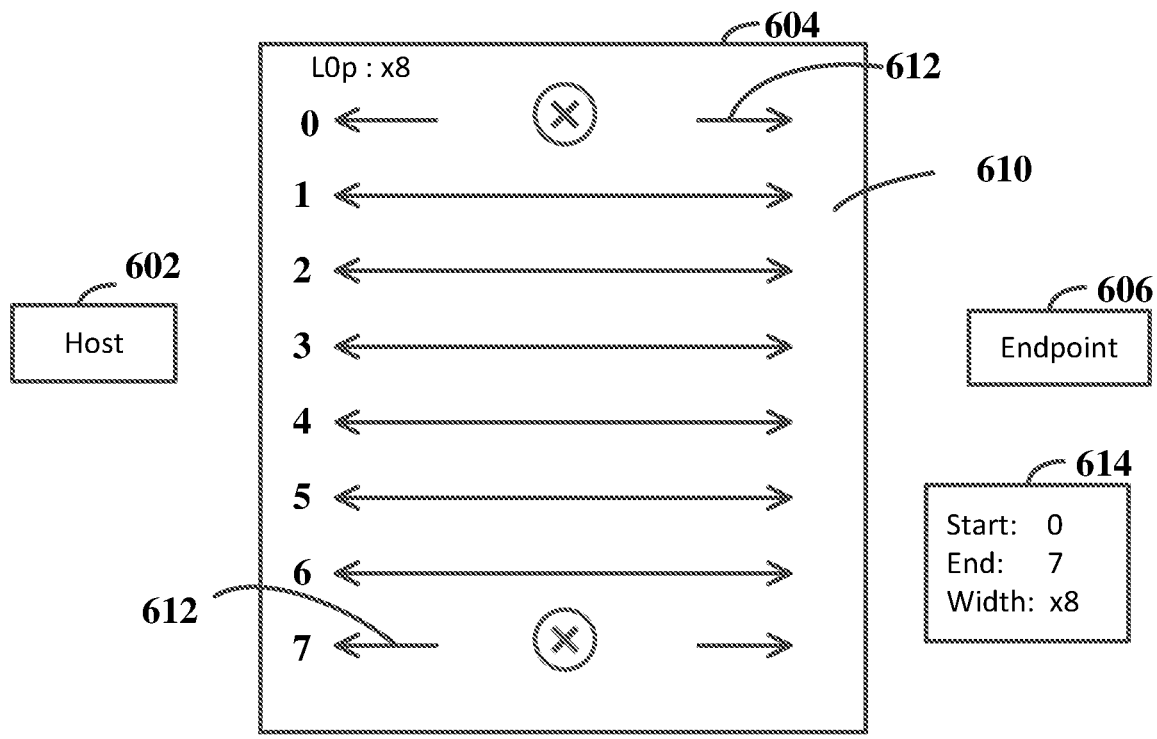
FIG. 6A is a diagram of a multiple lane data link with eight lanes and lanes 0 and 7 failed according to aspects of the present disclosure.

FIG. 6A shows a multiple lane data link 604 e.g., a PCIe link of duplex traffic lanes between a host 602 and an EP 606. The lanes each include a line in each direction so that the data rate and configuration is the same in both directions. The duplex traffic lanes may have the same physical structure as in FIG. 3 but are generalized to show a transition from one link width and lane configuration to another link width and lane configuration. The data link 604 includes eight lanes. All of the lanes 510, lanes 0 to 7, as identified on the right, are in an active state, e.g., an L0 state, as an x8 link. The configuration of the link may be stored in a configuration, control, or capabilities register 614 and includes a start address of 0, an end address of 7, and a width of x8.

Two of the lanes, lane 0 and lane 7, are failed lanes 612 and are unable to transmit any traffic. As a result, the entire link is down, regardless of the state of any of the lanes. The addresses, 0, 7, of the faulty lanes will also be stored in the capabilities register 614. Using the first lane as the start address, the link is lost and cannot be corrupted. Using lane reversal in which the first lane is lane 7, the link is also lost and cannot be recovered.

Figure 6B:
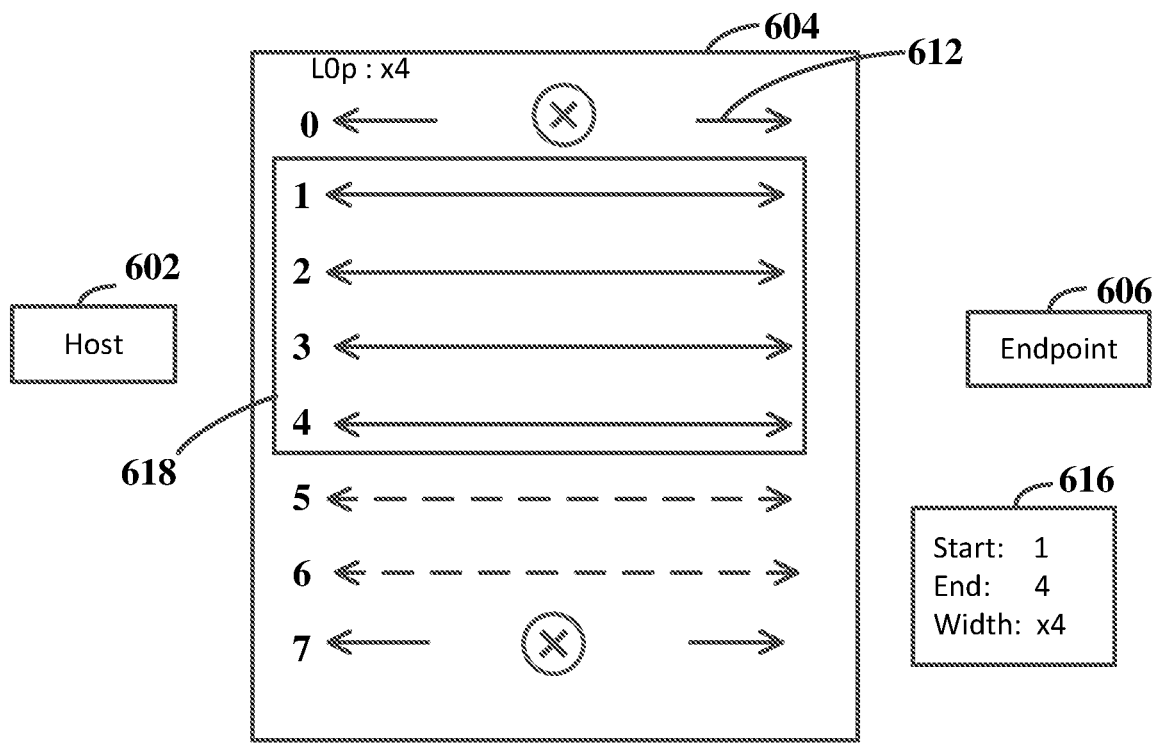
FIG. 6B is a diagram of a multiple lane data link with eight lanes operating with lanes 1-4 according to aspects of the present disclosure.

FIG. 6B shows the multiple lane data link 604 between the host 602 and the EP 606 after being reconfigured with a new start address and a new link width according to aspects of the disclosure. In one aspect, when a controller at the host 602 or EP 604 determines that lanes 0 and 7 have failed, it identifies a start address, in this case 1, and an end address, in this case 4 and establishes a link width, in this case x4. This leaves lanes 5 and 6 unused. As an alternative, an x4 link may be established with a start address of 2 or 3. The lanes that are not part of the operational link are therefore transitioned to an idle state, for example, an electrical idle state. The configuration is stored in registers 616 as the start address of 1, the end address of 4, and the link width of x4. In this example, the data link 604 was restored even though it otherwise might be lost and not recoverable.

Figure 7A:
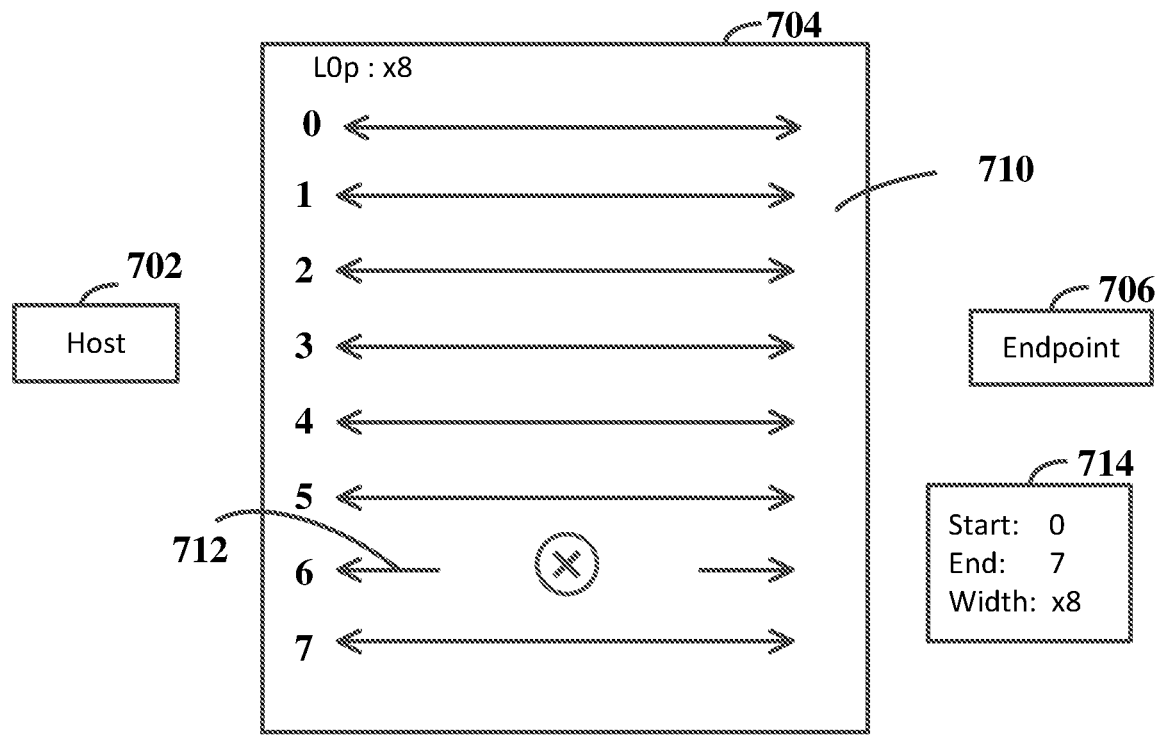
FIG. 7A is a diagram of a multiple lane data link with eight lanes and lane 6 failed according to aspects of the present disclosure.

FIG. 7A shows a multiple lane data link 704 e.g., a PCIe link of duplex traffic lanes between a host 702 and an EP 706. The data link 704 includes eight lanes. All of the lanes 710, lanes 0 to 7, as identified on the right, are in an active state, e.g., an L0 state, as an x8 link. The configuration of the link may be stored in a configuration, control, or capabilities register 614 and includes a start address of 0, an end address of 7, and a width of x8. In this example, the failed lane 712 is lane 6. As a result, there are six contiguous lanes, lanes 0 through 5 that are working lanes. Lane 7 is also a working lane.

Using the first lane as the start address, an x4 link can be established with lanes 0 through 3. Alternative x4 links can be established with lanes 1 through 4, and 2 through 5. Using an additional bit for link width other link widths might be supported such as x5 with lanes 1 through 4, or 1 through 5, or x6 with all of the contiguous working lanes.

Figure 7B:
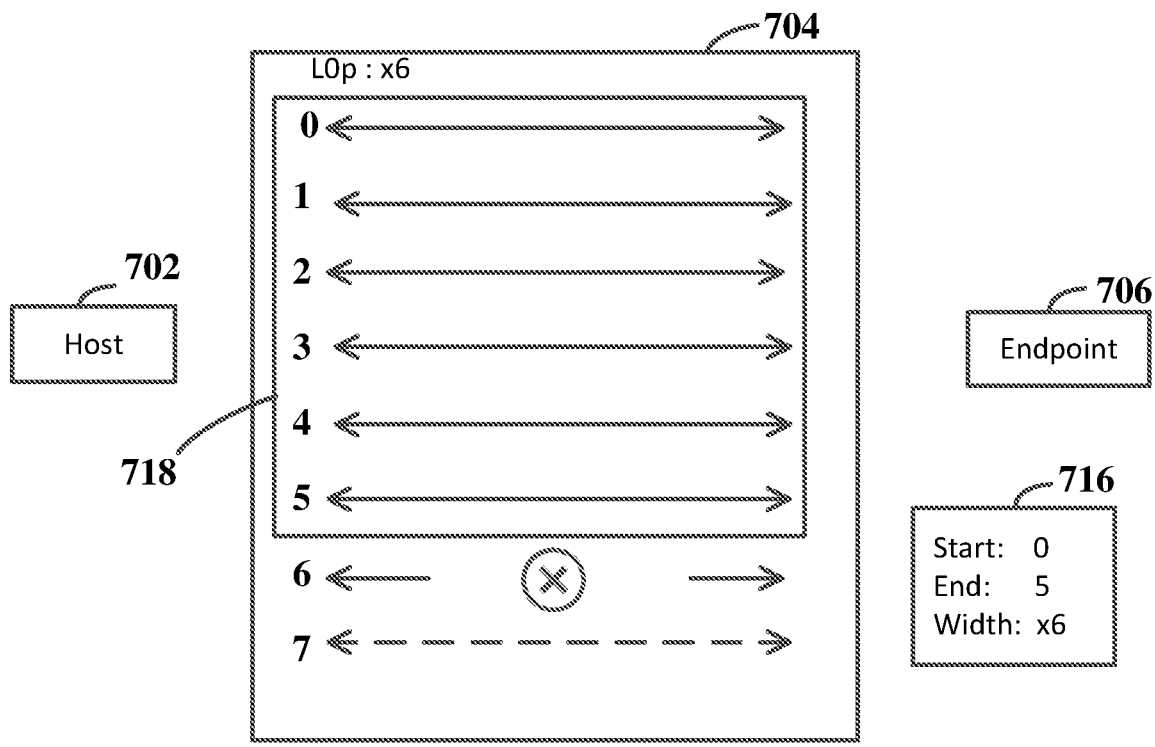
FIG. 7B is a diagram of a multiple lane data link with eight lanes operating with lanes 0-5 according to aspects of the present disclosure.

FIG. 7B shows the multiple lane data link 704 between the host 702 and the EP 706 after being reconfigured with a new start address and a new link width outside of the allowable link widths for a PCIe data link according to aspects of the disclosure. In this example, the link width is x6 which provided 50% more data carrying capability than an x4 link. The configuration is stored in registers 716 as the start address of 0, the end address of 5, and the link width of x6. In this example, the link may be identified with either the end address or the link width or both may be stored in the configuration register 716.

Figure 8A:
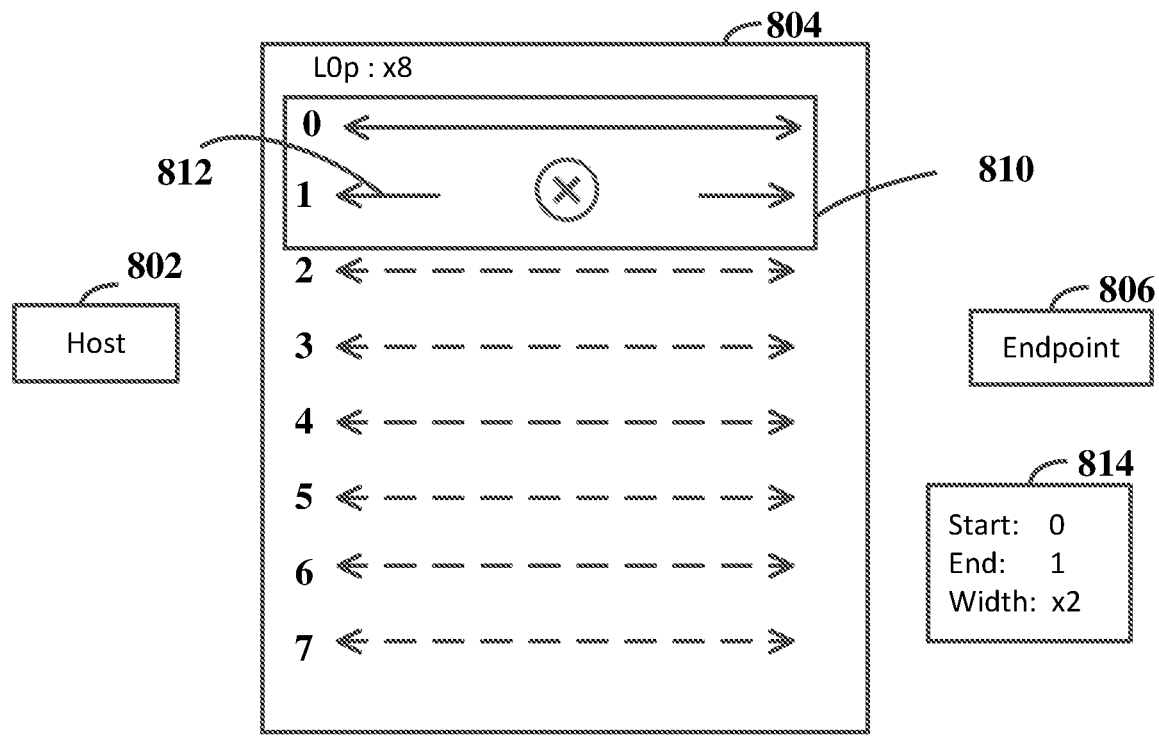
FIG. 8A is a diagram of a multiple lane data link with eight lanes operating as x2 and lane 0 failed according to aspects of the present disclosure.

FIG. 8A shows a multiple lane data link 804 e.g., a PCIe link of duplex traffic lanes between a host 802 and an EP 806. The data link 804 includes eight lanes. Only two of the lanes are in use in an active state as an x2 link 810. The rest of the lanes of the link, lanes 2 through 7, are in an idle state. The configuration of the link may be stored in a configuration, control, or capabilities register 714 and includes a start address of 0, an end address of 1, and a width of x2. In this example, the failed lane 812 is lane 1. As a result, there are six contiguous lanes, lanes 2 through 7 that are working lanes. Lane 1 is also a working lane.

Figure 8B:
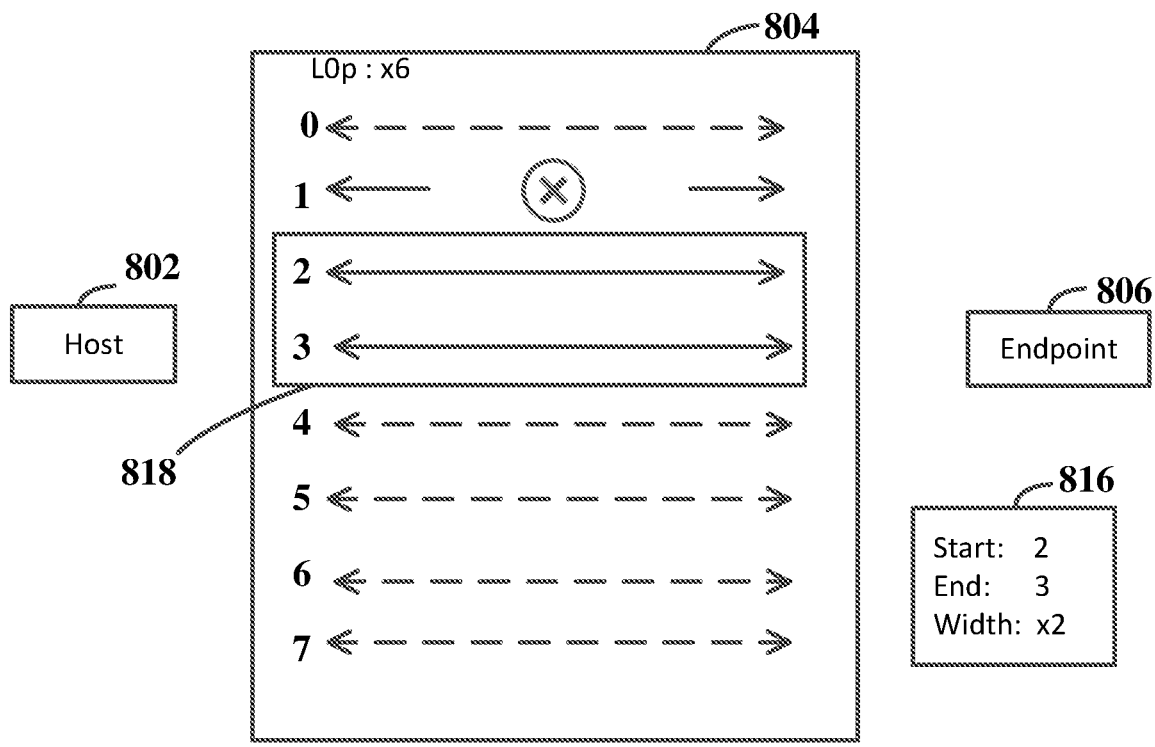
FIG. 8B is a diagram of a multiple lane data link with eight lanes operating with lanes 2-3 according to aspects of the present disclosure.

To obtain two consecutive lanes for a new x2 link without the failed lane 810, the controller may select any of five different pairs of lanes. In this example, the next two lanes, lanes 2 and 3 are selected as the set of contiguous working lanes of the data link. FIG. 8B shows the multiple lane data link 804 between the host 802 and the EP 806 after being reconfigured with a new start address and the same link width according to aspects of the disclosure. The configuration is stored in registers 816 as the start address of 2, the end address of 3, and the link width of x2. In this example, the link may be identified with either the end address or the link width or both may be stored in the configuration register 816.

Because the lanes of the new operational link, lanes 2 and 3, are not part of the original data link, lanes 0 and 1, the new operational link may be configured while the original data link is still in operation. The data traffic may be re-routed to the lanes 2 and 3 by first bringing those lanes to an active state, through a recovery state. Traffic may then be transferred to the fully operational link after it is already configured. This additional technique may be used any time that the new operational link does not include any of the lanes of the data link having the lane failure, lanes 0 and 1.

Figure 9:
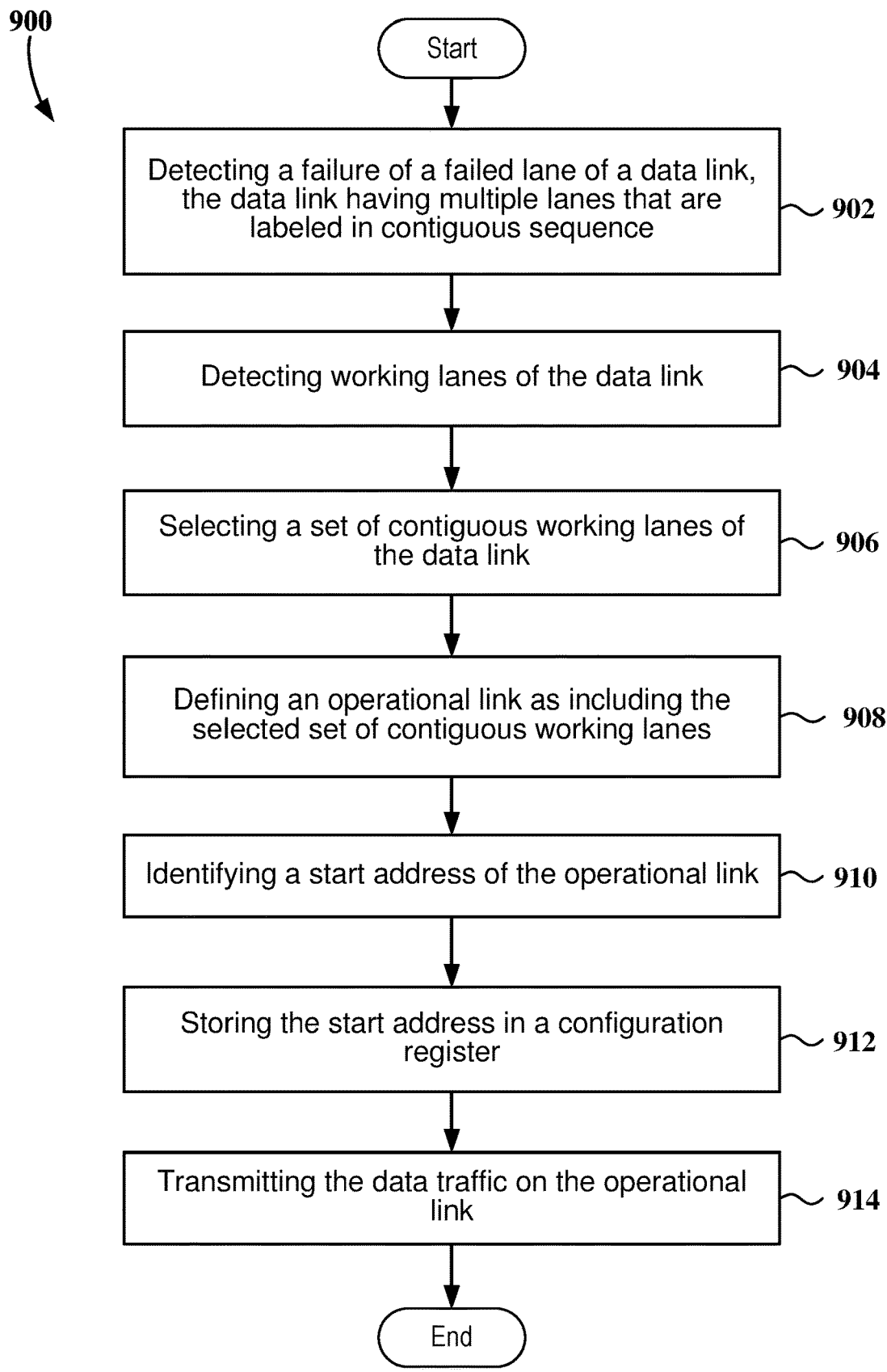
FIG. 9 is a flow diagram of an exemplary method for increasing data rates after a faulty lane recovery of multiple lane data links according to aspects of the present disclosure.

FIG. 9 illustrates a flow diagram of a method 900 for increasing data rates after a faulty lane recovery of multiple lane data links, e.g., a PCIe link, according to aspects of the present disclosure. In certain aspects, the method 900 involves defining an operational link as starting from an assignable start address on the link without limits to the first or last lane. The link width may also be defined as having different variations without being limited to multiples of two. In some aspects, the new operational link may be prepared before the data is transferred so that data is not lost during the recovery and configuration states. A method of recovering from a faulty lane in a PCIe link may be performed by PCIe controllers 218, 262 including the RC controller, also referred to as the host controller, and the EP controller. There is a negotiation to establish capabilities and bandwidth requirements. Once the negotiation is finished, then the RC controller triggers the method 900 to bring up a different set of contiguous working lanes for the data link. Once the lanes are up, the RC controller fires an interrupt to shift ongoing data transfers from the first set of active lanes to the second set of newly trained lanes.

The method 900 includes detecting a failure of a failed lane of a data link, the data link having multiple lanes that are labeled in a contiguous sequence at block 902. The data link has a first set of lanes in an active state and a second set of lanes in an idle state. The first set of lanes may have a lower or higher lane number than the second set of lanes. As described, the link is a PCIe link, however, the method may be adapted to suit other links with multiple lanes. The operation may include detecting only one failed lane or multiple failed lanes.

The method 900 includes a process at block 904 of detecting working lanes of the data link. The working lanes correspond to the lanes that are not failed lanes. For an x16 link with one failed lane there will be 15 working lanes. For 3 failed lanes there will be 13 working lanes, but in either case, the working lanes may not all be contiguous. The method 900 includes a process at block 906 of selecting a set of contiguous working lanes of the data link. The method 900 includes a process at block 908 of defining an operational link as including the selected set of contiguous working lanes.

The method 900 includes a process at block 910 of identifying a start address of the operational link. The method 900 includes a process at block 912 of storing the start address in a configuration register.

The method 900 includes a process at block 914 of transmitting the data traffic on the operational link. An interrupt may be sent to the host controller and to the end point controller to transfer the data traffic from the first set of lanes to the operational link. To facilitate the transfer, a controller may write an indicator to a control register to identify the operational link. For example, a start lane number and an end lane number, for the operational link, which is the active set of lanes, may be written to a control register. In addition, a controller may write an indicator of the width of the data link to the control register. A controller may also write a lane reversal indicator to a control register to indicate whether the first lane is the highest numbered lane or the lowest numbered lane in the link width. When L0p is enabled, a set of lanes may be in active state L0p and all other lanes may be in electrical idle.

The first set of lanes is no longer carrying traffic after the transferring. In some examples, the method 900 may optionally include changing the first set of lanes to an idle state or training the first set of lanes to the requested data rate and then changing the first set of lanes to an idle state. In some examples, the method 900 may also include training the first set of lanes to the requested data rate and then up-sizing or down-sizing the link width using the first set of lanes.

Figure 10:
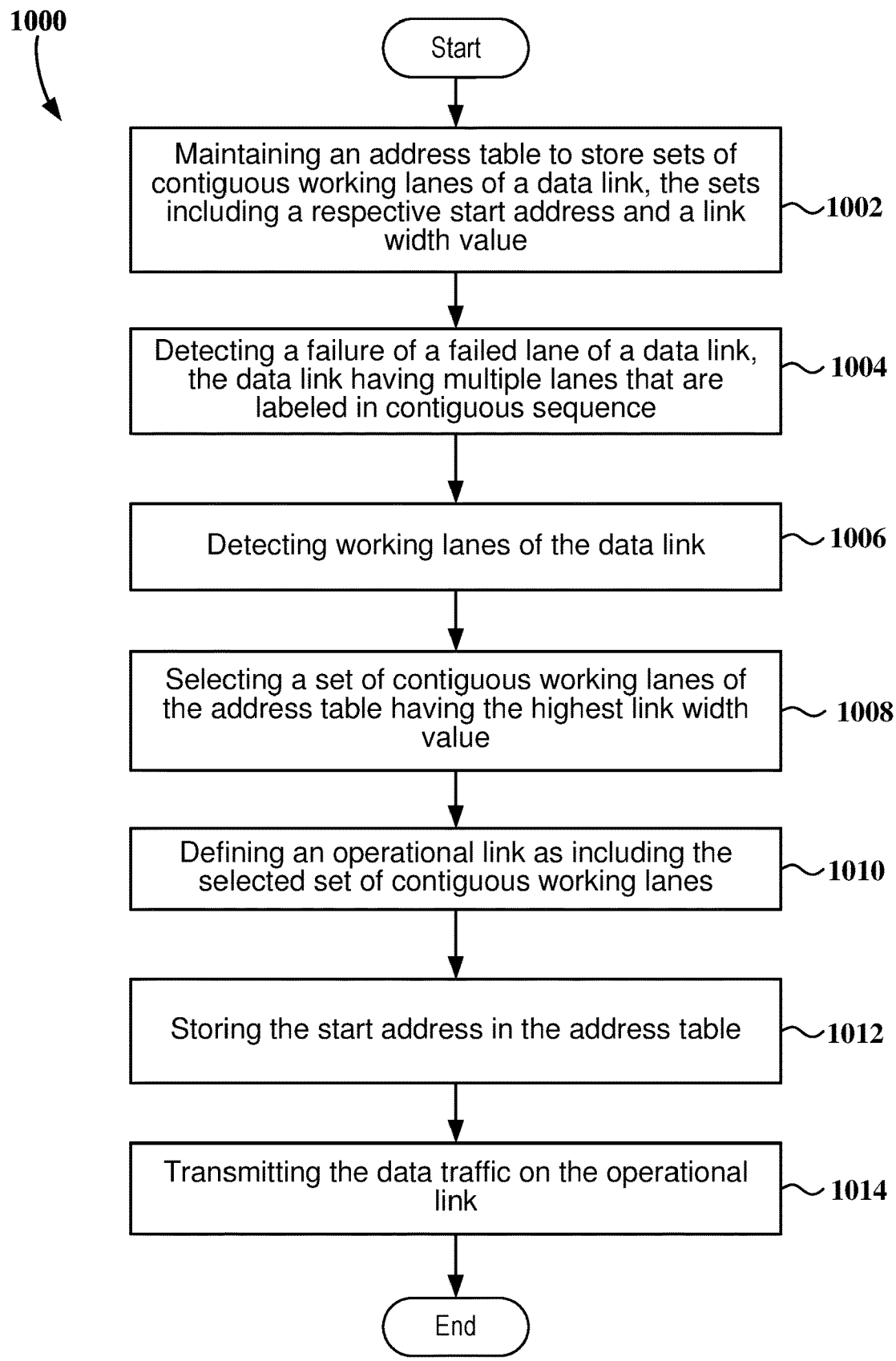
FIG. 10 is a flow diagram of an exemplary method for increasing data rates after a faulty lane recovery of multiple lane data links according to aspects of the present disclosure.

FIG. 10 illustrates a flow diagram of another method 1000 for increasing data rates after a faulty lane recovery of multiple lane data links, e.g., a PCIe link, according to aspects of the present disclosure. In certain aspects, the method 1000 involves defining an operational link as starting from an assignable start address on the link without limits to the first or last lane. The link width may also be defined as having different variations without being limited to multiples of two. In some aspects, the new operational link may be prepared before the data is transferred so that data is not lost during the recovery and configuration states. A method of recovering from a faulty lane in a PCIe link may be performed by PCIe controllers 218, 262 including the RC controller, also referred to as the host controller, and the EP controller. There is a negotiation to establish capabilities and bandwidth requirements. Once the negotiation is finished, then the RC controller triggers the method 1000 to bring up a different set of contiguous working lanes for the data link. Once the lanes are up, the RC controller fires an interrupt to shift ongoing data transfers from the first set of active lanes to the second set of newly trained lanes.

The method 1000 includes maintaining an address table to store sets of contiguous working lanes of a data link at block 1002. The sets include a respective start address and a link width value. The sets in the address table may also include an end address any other information. The address table may be stored at the PHY at the RC and also at the EP. The address table may be stored with the configuration registers or be a part of the configuration registers. The address table may be stored in the system memory 240, 274 or in any other suitable location. The address table may be updated upon link negotiation and upon the detection of a failure of any lane.

Table 1 is an example of an address table to store sets of contiguous working lanes of an x16 data link. The first row indicates the start address for each contiguous set of working lanes. The second row indicates the link width for each start address with the corresponding link width. In this example data set, all of the lanes are in working order. Table 2 is an example of a link width table for an x16 data link in which lane 5 has failed. In the PCIe standards, a link requires contiguous lanes numbering in a power of 2, for example x1, x2, x4, x8, x16, x32. Accordingly, starting with lane 0, 4 contiguous working lanes are available. Starting with lane 5, 1 contiguous working lane is available. Starting with lane 6, 8 contiguous working lanes are available. Starting with lane 14, 2 contiguous working laned are available. For the maximum number of lanes, the controller will select lane 6 as the starting lane and the link width of 8. Alternatively, if an x4 link is required, then the controller may select lane 0 or lane 6 as the start address. As a further alternative, for the x4 link, the controller may select lane 3 or lane 9 for the end address.

TABLE 1

| Start Address | 0 |
|---|---|
| Link Width | 16 |

TABLE 2

| Start Address | 0 | 5 | 6 | 14 |
|---|---|---|---|---|
| Link Width | 4 | 1 | 8 | 2 |

The method 1000 includes detecting a failure of a failed lane of a data link, the data link having multiple lanes that are labeled in a contiguous sequence at block 1004. One or more failed lanes may be detected depending on the condition of the link. The data link has a first set of lanes in an active state and a second set of lanes in an idle state. The first set of lanes may have a lower or higher lane number than the second set of lanes. As described, the link is a PCIe link, however, the method may be adapted to suit other links with multiple lanes. Upon the detection of one or more failed lanes, the address table may be updated to change the sets of contiguous working lanes, for example, if lane 5 fails, then the address table will look like table 2. The failed lanes may also be identified in a table stored with the address table as a part of the address table or as another table.

Table 3 is an example of a failed lanes table to store which lanes are failed and which lanes are working. The information in Table 3 may be combined with the information in Table 2. The first row indicates the address for each lane of an x16 link. The second row indicates the lane status as working (W) or failed (F). The information in Table 3 includes the status information that lane 5 is failed as in Table 2.

TABLE 3

| Lane Address | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Status | W | W | W | W | W | F | W | W | W | W | W | W | W | W | W | W |

The method 1000 includes a process at block 1006 of detecting working lanes of the data link. The address table may be updated wot change the sets of contiguous working lanes to correspond to the detected working lanes. The method 1000 includes a process at block 1008 of selecting a set of contiguous working lanes of the address table. When the address table includes a link width value for each set of contiguous working lanes, then the operation of selecting a set may be performed by selecting the set having the highest link width value. In another example, there may be a requested link width that is less than the total available link width. As an example, an x16 link may have a request to operate with a link width of 4. Any set having a link width value of 4 or more may be selected. The method 1000 includes a process at block 1010 of defining an operational link as including the selected set of contiguous working lanes.

The method 1000 includes a process at block 1012 of storing the start address in a configuration register. The start address is the start address of the selected set of contiguous working lanes. This start address is also stored in the address table. In another example, any other identifier of the selected set may be stored in the configuration register, such as a pointer to the entry in the address table corresponding to the selected set.

The method 1000 includes a process at block 1014 of transmitting the data traffic on the operational link. An interrupt may be sent to the host controller and to the end point controller to transfer the data traffic from the first set of lanes to the operational link. To facilitate the transfer, a controller may write an indicator to a control register to identify the operational link. For example, a start lane number and an end lane number, for the operational link, which is the active set of lanes, may be written to a control register. In addition, a controller may write an indicator of the width of the data link to the control register. A controller may also write a lane reversal indicator to a control register to indicate whether the first lane is the highest numbered lane or the lowest numbered lane in the link width. When L0p is enabled, a set of lanes may be in active state L0p and all other lanes may be in electrical idle.

The first set of lanes is no longer carrying traffic after the transferring. In some examples, the method 1000 may optionally include changing the first set of lanes to an idle state or training the first set of lanes to the requested data rate and then changing the first set of lanes to an idle state. In some examples, the method 1000 may also include training the first set of lanes to the requested data rate and then up-sizing or down-sizing the link width using the first set of lanes.

The following provides an overview of examples of the present disclosure.

Example 1: A method comprising: detecting a failure of a failed lane of a data link, the data link having multiple lanes that are labeled in contiguous sequence; detecting working lanes of the data link; selecting a set of contiguous working lanes of the data link; defining an operational link as including the selected set of contiguous working lanes; and transmitting data traffic on the operational link.

Example 2: The method of example 1, further comprising identifying a start address of the operational link; and storing the start address in a configuration register.

Example 3: The method of example 2, wherein the start address identifies a lane other than an end lane at an end of the contiguous sequence.

Example 4: The method of example 3, further comprising identifying an end address of a last lane of the operational link and writing the end address to the configuration register.

Example 5: The method of example 3 or 4, further comprising identifying a link width of the operational link and writing the link width to the configuration register.

Example 6: The method of example 5, wherein the link width corresponds to the selected set of contiguous lanes.

Example 7: The method of any one or more examples 1-6, further comprising sending an interrupt to an endpoint of the data link to transfer data traffic to the operational link.

Example 8: The method of example 7, wherein the interrupt includes a start address of a first lane of the operational link.

Example 9: The method of any one or more examples 1-8, wherein selecting a set of contiguous working lanes comprises selecting a number of lanes equal to a link width that is allowable for a PCIe data link.

Example 10: The method of any one or more examples 1-9, wherein selecting a set of contiguous working lanes comprises determining candidate sets of contiguous working lanes, determining a number of lanes of each candidate set, and selecting a candidate set having a largest number of lanes.

Example 11: The method of example 10, wherein selecting a set of contiguous working lanes comprises determining candidate sets of contiguous working lanes, determining a number of lanes of each candidate set, comparing each number of lanes to allowable link widths, and selecting the candidate set with a largest allowable link width.

Example 12: The method of any one or more examples 1-11, wherein selecting a set of contiguous working lanes comprises determining candidate sets of contiguous working lanes, determining a number of lanes of each candidate set, and selecting a candidate set having a requested link width.

Example 13: The method of any one or more examples 1-12, further comprising writing an enable indicator into a configuration register to indicate that a start address of the operational link is allowed to be an address other than an end address at an end of the contiguous sequence.

Example 14: The method of any one or more examples 1-13, wherein selecting a set of contiguous working lanes comprises selecting a set of contiguous working lanes offering the maximum link width for the data link using the configuration register.

Example 15: The method of any one or more examples 1-14, further comprising transmitting the data traffic on the lanes of the data link having the lane failure during training the working lanes of the operational link.

Example 16: The method of any one or more examples 1-15, further comprising maintaining an address table to store sets of contiguous working lanes of the data link, the sets each including a respective start address and a link width value, wherein selecting a set of contiguous working lanes comprises selecting a set of working lanes of the address table having the highest link width value, and wherein storing the start address comprises storing the start address in the address table.

Example 17: An apparatus comprising: an interface circuit configured to provide an interface with a multiple lane data link; configuration registers to store parameters of the data link; and a controller configured to: detect working lanes of the data link; select a set of contiguous working lanes of the data link; define an operational link as including the selected set of contiguous working lanes; and transmit data traffic on the operational link.

Example 18: The apparatus of example 17, wherein the controller is further configured to identify an end address of a last lane of the operational link and write the end address to the configuration register.

Example 19: The apparatus of example 17 or 18, wherein the controller is further configured to identify link width of the operational link and write the link width to the configuration register.

Example 20: The apparatus of any one or more examples 17-19, wherein the controller is further configured to identify a start address of the operational link and to send an interrupt including the start address to an endpoint of the data link to transfer data traffic to the operational link.

Example 21: The apparatus of any one or more examples 17-20, wherein selecting a set of contiguous working lanes comprises determining candidate sets of contiguous working lanes, determining a number of lanes of each candidate set, and selecting a candidate set having the largest number of lanes.

Example 22: The apparatus of any one or more examples 17-21, wherein the controller is further configured to write an enable indicator into the configuration register that a start address of the operational link is allowed to be an address other than an end address at an end of the contiguous sequence.

Example 23: An apparatus comprising: means for detecting a failure of a failed lane of a data link, the data link having multiple lanes that are labeled in contiguous sequence; means for detecting working lanes of the data link; means for selecting a set of contiguous working lanes of the data link; means for defining an operational link as including the selected set of contiguous working lanes; and means for transmitting data traffic on the operational link.

Example 24: A non-transitory computer-readable medium having instructions stored therein for causing a processor of an interconnect link to perform operations comprising: detecting a failure of a failed lane of a data link, the data link having multiple lanes that are labeled in contiguous sequence; detecting working lanes of the data link; selecting a set of contiguous working lanes of the data link; defining an operational link as including the selected set of contiguous working lanes; and transmitting data traffic on the operational link.

Example 25: A non-transitory computer-readable medium having instructions stored therein for causing a processor of an interconnect link to perform operations of any one or more of the above methods.

It is to be appreciated that the present disclosure is not limited to the exemplary terms used above to describe aspects of the present disclosure. E.g., bandwidth may also be referred to as throughput, data rate or another term.

Although aspects of the present disclosure are discussed above using the example of the PCIe standard, it is to be appreciated that present disclosure is not limited to this example, and may be used with other standards.

The host clients 214, the host controller 212, the device controller 252 and the device clients 254 discussed above may each be implemented with a controller or processor configured to perform the functions described herein by executing software including code for performing the functions. The software may be stored on a non-transitory computer-readable storage medium, e.g., a RAM, a ROM, an EEPROM, an optical disk, and/or a magnetic disk, shows as host system memory 240, endpoint system memory 274, or as another memory.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method comprising:
   detecting a failure of a failed lane of a data link, the data link having multiple contiguous lanes;
   detecting working lanes of the data link;
   selecting a set of contiguous working lanes of the data link by determining candidate sets of contiguous working lanes, determining a number of lanes of each candidate set, and selecting a candidate set having a requested link width;
   defining an operational link as including the selected set of contiguous working lanes; and
   transmitting data traffic on the operational link.

2. The method of claim 1, further comprising:
   identifying a start address of the operational link; and
   storing the start address in a configuration register.

3. The method of claim 2, wherein the data link has a first lane at one end of the contiguous lanes and a last lane at an opposite lane of the contiguous lanes, and wherein the start address identifies a lane other than the first lane and the last lane of the data link.

4. The method of claim 3, further comprising identifying an end address of a last lane of the operational link and writing the end address to the configuration register.

5. The method of claim 2, further comprising identifying a link width of the operational link and writing the link width to the configuration register.

6. The method of claim 5, wherein the link width corresponds to the selected set of contiguous working lanes.

7. The method of claim 1, further comprising sending an interrupt to an endpoint of the data link to transfer data traffic to the operational link.

8. The method of claim 7, wherein the interrupt includes the start address of the operational link.

9. The method of claim 1, wherein the requested link width comprises a number of lanes equal to a link width that is allowable for a PCIe data link.

10. The method of claim 1, wherein the requested link width comprises a largest number of lanes.

11. The method of claim 10, wherein the requested link width comprises a largest allowable link width.

12. The method of claim 1, further comprising writing an enable indicator into a configuration register to indicate that a start address of the operational link is allowed to be a lane other than an end lane of the data link.

13. The method of claim 12, wherein selecting a set of contiguous working lanes comprises selecting a set of contiguous working lanes offering the maximum link width for the operational link using the configuration register.

14. The method of claim 1, further comprising transmitting the data traffic on the lanes of the data link having the lane failure during training the working lanes of the operational link.

15. The method of claim 1, further comprising maintaining an address table to store sets of contiguous working lanes of the data link, the sets each including a respective start address and a link width value, wherein selecting a set of contiguous working lanes comprises selecting a set of working lanes of the address table having the highest link width value, and wherein storing the start address comprises storing the start address in the address table.

16. The method of claim 1,
   wherein the data link includes a first lane at one end of the contiguous lanes, a last lane at an opposite end of the contiguous lanes, and the failed lane,
   wherein the set of contiguous working lanes has a start address as a lane that is not the first lane and is not the last lane of the data link, and
   wherein defining an operational link comprises defining the operational link as having the start address.

17. An apparatus comprising:
   an interface circuit configured to provide an interface with a multiple lane data link;
   configuration registers to store parameters of the data link; and
   a controller configured to:
      detect working lanes of the data link;
      select a set of contiguous working lanes of the data link by determining candidate sets of contiguous working lanes, determining a number of lanes of each candidate set, and selecting a candidate set having a requested link width;
      define an operational link as having the start address and including the selected set of contiguous working lanes; and
      transmit data traffic on the operational link.

18. The apparatus of claim 17, wherein the controller is further configured to identify an end address of a last lane of the operational link and write the end address to the configuration register.

19. The apparatus of claim 17, wherein the controller is further configured to identify a link width of the operational link and write the link width to the configuration register.

20. The apparatus of claim 17, wherein the controller is further configured to identify a start address of the operational link and to send an interrupt including the start address to an endpoint of the data link to transfer data traffic to the operational link.

21. The apparatus of claim 17, wherein the selected link width comprises a largest number of lanes.

22. The apparatus of claim 17, wherein the controller is further configured to write an enable indicator into the configuration register that a start address of the operational link is allowed to be an address other than an end address at an end of the contiguous sequence.

23. An apparatus comprising:

means for detecting a failure of a failed lane of a data link, the data link having multiple contiguous lanes;

means for detecting working lanes of the data link;

means for selecting a set of contiguous working lanes of the data link by determining candidate sets of contiguous working lanes, determining a number of lanes of each candidate set, and selecting a candidate set having a requested link width;

means for defining an operational link as including the selected set of contiguous working lanes; and means for transmitting data traffic on the operational link.

24. A non-transitory computer-readable medium having instructions stored therein for causing a processor of an interconnect link to perform operations comprising:

detecting a failure of a failed lane of a data link, the data link having multiple contiguous lanes;

detecting working lanes of the data link;

selecting a set of contiguous working lanes of the data link by determining candidate sets of contiguous working lanes, determining a number of lanes of each candidate set, and selecting a candidate set having a requested link width;

defining an operational link as including the selected set of contiguous working lanes; and transmitting data traffic on the operational link.

\* \* \* \* \*